March 11, 1969 R. N. ANDRAE ET AL 3,431,672
MODEL AIRCRAFT RETRACTABLE LANDING GEAR
Filed Aug. 27, 1965
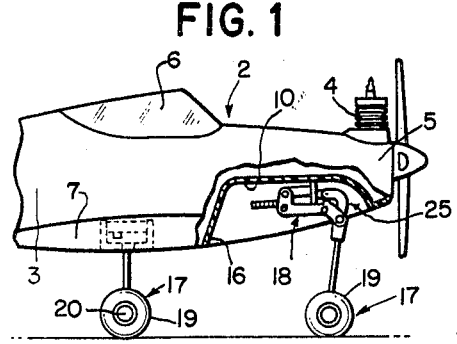
FIG. 1
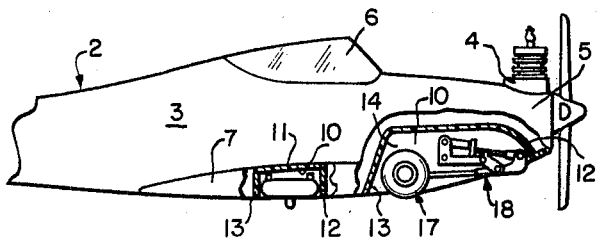
FIG. 2
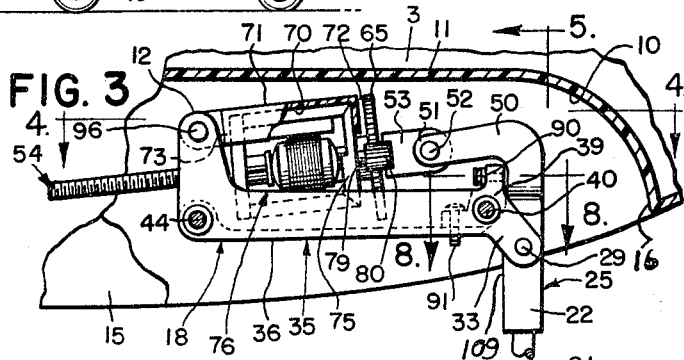
FIG. 3
FIG. 5
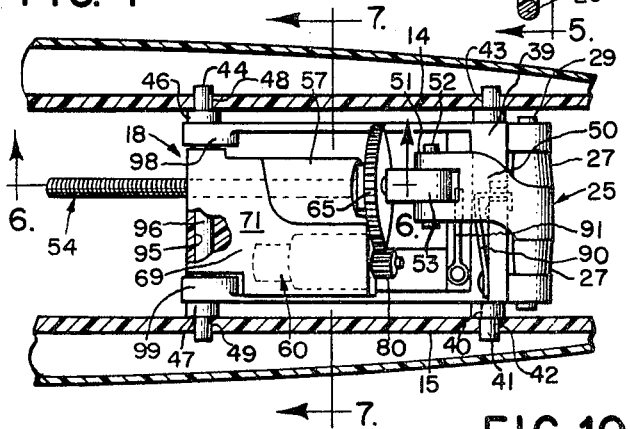
FIG. 4
FIG. 6
FIG. 7
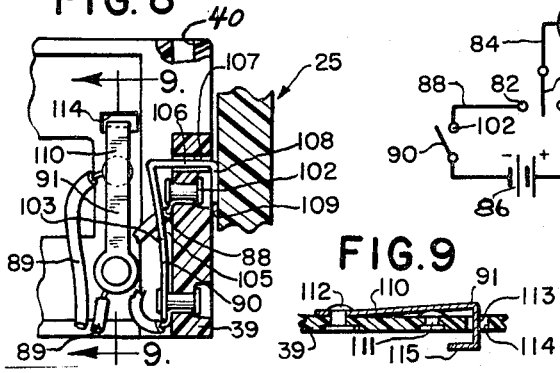
FIG. 8
FIG. 10
FIG. 9
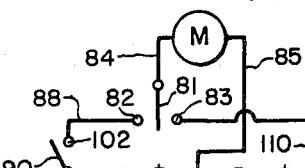
INVENTORS
Ralph N. Andrae
Theodore G. Camis, Jr.
BY John J. Kowalik
ATTORNEY

United States Patent Office 3,431,672
Patented Mar. 11, 1969

3,431,672
MODEL AIRCRAFT RETRACTABLE
LANDING GEAR
Ralph N. Andrae, 5821 W. Henderson, Chicago, Ill. 60634, and Theodore G. Camis, Jr., 8931 N. Moody Ave., Morton Grove, Ill. 60053
Filed Aug. 27, 1965, Ser. No. 483,161
U.S. Cl. 46—78          7 Claims
Int. Cl. A63h 27/02

ABSTRACT OF THE DISCLOSURE

A model aircraft retractible landing gear having a frame pivotally supporting a wheel-carrying strut, a screw pivoted to the strut, a nut threaded on the screw, a motor housing pivotally supported on the frame and rotatably mounting the nut, and gearing driven by the motor for rotating the nut. Rotation of the nut retracts and extends the screw which pivots the wheel-carrying strut to extended and retracted positions.

---

This invention relates to landing gears for model aircraft and more specifically to a novel gear which may be retracted or extended while such model is in flight to improve the aerodynamic characteristics of the craft and improve its appearance and also to simulate the actual unit.

A general object of the invention is to devise a novel landing gear which is proportioned to easily fit into existing models of aircraft and which will function with equal facility as a nose wheel or wing wheel.

A further object of the invention is to devise such landing gear which operates positively and in which the linkage serves as the strut structure.

Another object of the invention is to devise a novel landing gear assembly which incorporates an electrically driven reversible motor and switching means which is conditioned by the position of the mechanism.

A further object of the invention is to provide a novel lightweight gear in which the parts are interlocked with one another in a novel, self-sustaining relationship whereby eliminating needless, weight-adding connections.

The invention comprehends the provisions of a motor enclosing housing which forms one of the links of the linkage and wherein at least portions of the linkage is formed of self-lubricating, dielectric material, such as nylon, and wherein these portions are arranged to mount the switching means.

The invention also contemplates the use of such material for the motor housing and so constructing the housing that by slight temporary distortion, the motor is accommodated access into the housing and recovery of the material encases the motor securely within the housing whereby the motor is yieldably held in the housing which also absorbs the shocks to which the mechanism is subjected in use.

The invention also provides a novel arrangement of the linkage parts which may be conveniently housed within the fuselage or wing of such model aircraft in concealing as well as protective realtion thereto.

A still further object of the invention is to provide a novel linkage which in the retracted position of the wheel disposes the links in extension and in the extended position of the wheel retracts the linkage whereby the linkage is disposed when an impact load is imposed thereon with the parts in optimum load carrying position.

These and other objects and advantages inherent in and encompassed by the invention will become more readily apparent from the specifications and the drawings, wherein:

FIGURE 1 is a fragmentary side elevational view of a model aircraft partly in longitudinal section illustrating the novel landing gear incorporated as a nose and wing wheel assemblies, and showing the wheels extended;

FIGURE 2 is similar to FIGURE 1 showing the wheels retracted;

FIGURE 3 is an enlarged fragmentary side elevational view partly broken away and in section of the novel gear and mounting thereof;

FIGURE 4 is a horizontal sectional view taken substantially on line 4—4 of FIG. 3;

FIGURE 5 is a transverse vertical sectional view taken substantially on line 5—5 of FIGURE 3;

FIGURE 6 is a longitudinal sectional view screw actuator means taken substantially on line 6—6 of FIGURE 4;

FIGURE 7 is a transverse vertical sectional view taken substantially on line 7—7 of FIGURE 4;

FIGURE 8 is a fragmentary sectional view taken generally on line 8—8 of FIGURE 3;

FIGURE 9 is a fragmentary sectional view taken substantially on line 9—9 of FIGURE 8; and FIGURE 10 is a schematic diagram of the electrical circuit.

DESCRIPTION OF THE INVENTION

Describing the invention in detail and having particular reference to the drawings there is shown a model aircraft generally designated 2 which comprises an airframe including a longitudinal fuselage 3 housing a propeller driving motor 4 in its nose 5 and provided with a cockpit 6 over the wing 7. The remainder of the aircraft is of conventional design including the tail empennage, namely, the elevators and rudder, etc. as is well known to those skilled in the art.

The body of the fuselage 3 as well as the wing 7 at each side of the fuselage comprises a well 10 which may include a top wall structure 11 from opposite ends of which may depend end walls 12 and 13 and from the lateral edges of which may depend side walls 14, 15. The walls 12 through 15 define a bottom opening 16 through which the wheel structure 17 of our novel gear 18 is adapted to extend and retract.

The wheel assembly 17 includes a wheel 19 journaled upon a laterally bent spindle portion 20 at the lower end of a strut 21 which at its other end is suitably secured as by cementing or by press fit into one end portion 22 a lever element 25 which is formed of plastic, such as nylon.

The lever element 25 is tapered outwardly at its end 22 to provide minimal drag and to thus minimally disturb the flying characteristics of the craft to which it is attached. The lever element 25 comprises an elongated intermediate portion 26 which is a continuation of said end portion 22 and the portion 26 is formed intermediate its ends with transversely coaxial trunnions 27, 27 which have a common horizontal bore 28 through which there extends a pivot pin 29 which at its ends 30, 31 tightly fits into openings in lugs 32, 33 (FIG. 5) formed at one end of a mounting element or frame member generally designated 35, which may be formed of plastic, such as nylon.

The mounting frame 35 comprises an elongated structure of U-shape having a bottom wall 36 and upstanding lateral flanges 37, 38 and a front upstanding interconnecting flange 39 which is thicker than flanges 37, 38 and has a horizontal bore 40 through which extends a mounting pin 41 which at its ends extends through apertures 42, 43 in the walls 14, 15 of the associated mounting well in the aircraft. Similarly the flanges 37, 38 at the rear end of the frame element 35 mount in aligned apertures a generally horizontal pin 44 which extends through spacer embossments 46, 47 on flanges 37, 38 and through suitable aligned tight apertures 48, 49 in the side walls 14, 15 of the associated pocket.

The intermediate portion 26 of lever 25 extends above flange 39 of the mounting frame member and at its upper end is integrally united with a rearwardly extending upper end portion 50 which is disposed at an angle of between 75° to 90° to the portion 26 and overhangs the flange 39 and extends toward the rear end of the member 35. The portion 50 has a distal end 51 pivotally connected by a horizontal pivot pin 52 to the forward end 53 of an actuating screw 54 which is threaded at 53a into a drive quill or sleeve 55.

The sleeve 55 is rotatably mounted in a bore 56 (FIG. 6) located in a massive body or spine portion 57 at one side of a motor support generally designated 60. A snap ring 61 fits into a groove 62 at one end of the quill 55 and rotatably engages one end 63 of the body portion 57. The opposite end of the quill is provided with a gear 65 (FIG. 6) which abuts a bearing washer 66, the washer 66 engaging as at 67 the forward end of body portion 57.

A motor housing portion 69 (FIG. 7) is integrally formed at one side of the body portion 57 and comprises an upper pocket portion 70 including a top web 71 with depending front and rear flanges 72, 73 (FIG. 3) and an outboard flange 74. The pocket 70 complementally snugly admits the upper portion of the rectangular or cubical casing 75 of a miniature electric motor 76. The mounting member is of resilient plastic, such as nylon, whereby the walls are adapted to distort and tightly clamp onto the motor casing 75. A lower shelf 77 is provided extending from body portion 57 which projects under the lower side 78 of casing 75. Thus the motor is easily snapped in and out of the housing 69 by distorting the housing.

The motor 76 has a drive shaft 79 with a spur gear 80 attached thereto, the gear 80 meshing with and driving the gear 65 pursuant to closing the switch 81 to either contact 82 or 83, the switch 81 (FIG. 10) connected to a line 84 to one side of the motor 76. The other side of the motor is connected by line 85 to the positive side of one battery 86 and the negative side of another battery 87. Contacts 82 and 83 are connected by lines 88, 89 through control switches 90, 91 to the negative pole of battery or power source 86 and the positive pole of battery 87 respectively.

If the switch 81 contacts point 82 and switch 90 is closed a circuit is completed through lines 88, 84 and 85 rotating the motor in one direction to retract the gear by rotating the quill in a direction threading the screw into the quill whereby swinging the lever in a counterclockwise direction (FIG. 3) extending the landing gear to a position shown in FIGURE 1.

The support 60 is provided with a horizontal bore 95 which holds pin 97 therein and the pin 97 extends at opposite ends into apertured ear embossments 98, 99. This accommodates pivoting movement of the element 60, the motor and actuating screw about a horizontal axis as the lever pivot 52 swings about an arc.

In order to retract the gear the switch 81 is closed with point 83 and switch 91 is closed and the circuit is completed through the battery 87 to the motor by lines 85 and 89, 84.

An ingenious arrangement of these switches 90, 91 is provided on the frame member 35. As best seen in FIGURES 8 and 9 the switch 90 comprises a contact point 102 which is connected to line 88 and a spring type contact arm 103 which is anchored at one end as at 104 to flange 39 and diverges from the inner side 105 of flange 39 and at its free end has an operating lug 106 extending through an opening 107 in flange 39, the lug 106 has a bent end bearing portion 108 which is engaged by the inner side 109 of the portion 26 of lever 25 upon the gear being extended whereby flexing the contact arm 103 away from contact 102 thus breaking the circuit from battery 86 to the motor and stopping extension.

As best seen in FIGURES 3 and 9 the switch 91 is similar to switch 90 and comprises a resilient contact arm 110 (FIG. 9) normally biased to closed position with the contact 111 which connects to contact 83 through wire 89. One end of the arm 110 is anchored by rivet 112 to the base wall 39 of element 35. The free end of arm 110 has an extending lug 113 which extends downwardly through opening 114, the lower end of lug 113 having an enlarged bent bearing end portion 115 which is adapted to engage the side 109 of the portion 26 of lever 25 upon the lever swinging in a counterclockwise direction (FIG. 3) to retracted position of the gear whereby breaking the circuit in lines 85, 89, 84 to the motor and thus stopping retraction. It will be understood that the motor is of a reversing direct current type and depending upon the polarity of the current runs in either direction. Of course a single battery may be used with a crossover circuit as will be readily apparent, but the low voltage and low current drain motor can run for a very long time on the dual batteries. The switch 81 is adapted to be actuated by a pull chord which may be attached to the anchor and guide or operating wires normally associated with model aircraft of course, the switch may be incorporated in a suitable radio circuit, in radio controlled plane.

We claim:

1. In a landing gear structure for mounting in the fuselage and wings of a model aircraft having wells therein each well having an open bottom and including a pair of upright side walls, the combination comprising: a support adapted to extend lengthwise between said walls adjacent to said bottom, means on said support for securing said support to said walls, a lever pivoted on a generally horizontal axis to one end of said support and having upper and lower end portions, a wheel-supporting strut connected to the lower end portion, said upper end portion disposed in vertical overlapping relation with one end of the support and directed toward the other end of the support and terminating intermediate the ends thereof, a drive assembly support element pivoted to the other end of the support, a motor and driving train including a gear driven by the motor supported on said element, a screw element pivotally connected to the upper portion of said lever and threaded into the gear for extension and retraction thereby pursuant to rotation of the gear, said screw element being disposed in retracted position upon the strut being disposed in landing position and being extended attendant to the strut being disposed in retracted position.

2. The invention according to claim 1 and said support having at least a portion thereof of dielectric material, and first switch means mounted on said portion at one side of said axis of pivot of said lever for engagement thereby to open the switch means to terminate retraction movement of the lever, and second switch means at the opposite side of the axis of pivot of the lever for engagement thereby to open the second switch means to terminate extension of the lever.

3. The invention according to claim 1 and said element comprising a deformable plastic structure and including a motor encasing cavity, and said motor snugly fitted within the cavity.

4. The invention according to claim 1 and a reversing electrical circuit for operating the motor including control switches carried by said support for alternative engagement by the lever in different positions thereof for stopping the motor and conditioning the circuit to operate in reverse directions and a main switch for completing the circuit in a direction of the then connected control switch.

5. A model aircraft retractable landing gear comprising a frame for mounting on the fuselage and wings of a model aircraft, a landing wheel strut lever assembly, pivot means mounting said assembly on said frame, means for pivoting said strut lever assembly on said pivot means between retracted and extended positions and comprising interthreaded screw and nut elements, said screw element pivotally connected to said strut lever assembly, a motor support member pivoted on said frame on an axis spaced from said pivot means and comprising a pocket portion, a motor removably mounted in said pocket portion, a driving connection between said motor and said nut element, said pocket portion including springable motor-embracing web means for snugly holding the motor means in said pocket portion and being deflectible and biasing the parts of said driving connection into operative position.

6. The invention according to claim 5 and said driving connection comprising a gear train including a spur gear connected to one of said interthreaded elements and rotatable therewith and a spur gear connected to the motor, and the said web means flexible radially with respect to the axes of rotation of said spur gears and holding the gears of said gear train in meshing relation.

7. The invention according to claim 5 and said driving connection comprising a driven gear connected to said nut element and a quill rotatably mounting the driven gear on said motor support member, and said driving connection further comprising gear means between the motor and said driven gear, and said gear means and driven gear being all mounted on generally parallel axes on said motor support member, and said one element comprising said screw.

References Cited
UNITED STATES PATENTS

| | | | |
|---|---|---|---|
| 2,387,713 | 10/1945 | Bradford | 244—102 X |
| 2,459,982 | 1/1949 | Wells | 244—102 |
| 2,551,788 | 5/1951 | Cameron | 46—78 |

ROBERT PESHOCK, *Primary Examiner.*

C. R. WENTZEL, *Assistant Examiner.*